United States Patent
Ludeman et al.

(10) Patent No.: US 12,527,425 B2
(45) Date of Patent: Jan. 20, 2026

(54) FOOD CORING DEVICE

(71) Applicant: Williams-Sonoma, Inc., San Francisco, CA (US)

(72) Inventors: Karl Edward Ludeman, Oakland, CA (US); Caleb Ferris, Oakland, CA (US)

(73) Assignee: Williams-Sonoma, Inc., San Francisco, CA (US)

(*) Notice: Subject to any disclaimer, the term of this patent is extended or adjusted under 35 U.S.C. 154(b) by 157 days.

(21) Appl. No.: 18/318,072

(22) Filed: May 16, 2023

(65) Prior Publication Data

US 2023/0404312 A1     Dec. 21, 2023

Related U.S. Application Data

(60) Provisional application No. 63/343,834, filed on May 19, 2022.

(51) Int. Cl.
*A47J 25/00*     (2006.01)

(52) U.S. Cl.
CPC .................... *A47J 25/00* (2013.01)

(58) Field of Classification Search
CPC .. A47J 25/00; A47J 17/02; A47J 17/00; A47J 17/04; A47J 17/06; A47J 43/28; A47J 23/00; B26B 27/00
USPC ...... 30/113.1, 113.2, 113.3, 130, 277.4, 276, 30/272.1, 114.355; 99/544, 554, 542, 99/547, 565; D7/680–696, 393, 395, 368, D7/669
See application file for complete search history.

(56) References Cited

U.S. PATENT DOCUMENTS

| | | | | |
|---|---|---|---|---|
| 580,563 A * | 4/1897 | Totten | A47J 25/00 | 30/135 |
| 3,292,257 A * | 12/1966 | Popeil | A23N 15/04 | 30/130 |
| 3,307,258 A * | 3/1967 | Hammeborg | B29C 45/14 | 81/416 |
| 3,972,333 A * | 8/1976 | Leveen | A61B 17/30 | 606/174 |
| 4,495,696 A * | 1/1985 | Fethke | B24D 15/063 | 451/540 |
| 5,093,996 A * | 3/1992 | Gross | B26B 13/18 | 30/261 |
| 5,115,565 A * | 5/1992 | Narlock | A47J 23/00 | 30/123.5 |
| 5,964,033 A * | 10/1999 | Wolf | A45D 29/16 | 30/28 |

(Continued)

*Primary Examiner* — Ghassem Alie
(74) *Attorney, Agent, or Firm* — Cook Alex Ltd.

(57) ABSTRACT

A food coring device includes a first blade and a second blade and a first stop member and a second stop member. The first blade is attached to a first stop member and the second blade is attached to a second stop member with the first blade opposing the second blade and the first stop member including a first stop surface and the second stop member including a second stop surface. A spring member urges the first and second stop members towards a first position where the first and second stop surfaces are disengaged. During use, the first and second stop members may be placed in a second position by moving the first and second stop members together against the urging of the spring member such that the first stop surface is engaged by the second stop surface.

7 Claims, 8 Drawing Sheets

(56) References Cited

U.S. PATENT DOCUMENTS

| | | | | |
|---|---|---|---|---|
| 7,845,081 B1 | * | 12/2010 | Shultz | A47J 25/00 |
| | | | | D7/696 |
| D825,289 S | * | 8/2018 | de Martrin-Donos | D7/696 |
| 10,334,978 B1 | * | 7/2019 | Pogosian | A47J 17/02 |
| 2005/0204566 A1 | * | 9/2005 | Loporcaro | B26B 13/06 |
| | | | | 30/151 |

* cited by examiner

FOOD CORING DEVICE

CLAIM OF PRIORITY

This application claims the benefit of U.S. Provisional Application No. 63/343,834, filed May 19, 2022, the contents of which are hereby incorporated by reference in their entirety.

TECHNICAL FIELD

The present disclosure generally relates to food preparation tools. More particularly, the present disclosure relates to food coring devices.

BACKGROUND

Food coring devices are popular with both restaurant chefs and home cooks for removing cores from food items, such as tomatoes and apples. A coring device typically includes one or more blades attached to a handle. A user grips the handle and moves the blade(s) into the food item so that the blade(s) encompass the core. After the blade(s) encompass the core, the device is removed from the food item, taking the core with it.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In a first aspect, a food coring device is disclosed. The coring device has a first blade and a second blade. The first blade is attached to a first stop member and the second blade is attached to a second stop member. The first blade opposes the second blade. The first stop member includes a first stop surface and the second stop member includes a second stop surface. The coring device also includes a spring member which moves the first and second stop members toward a first position. In the first position, the first and second stop surfaces are disengaged. The first and second stop members may be placed in a second position by moving the first and second members together such that the first stop surface is engaged by the second stop surface.

In a second aspect, a method for removing a core from a food item includes the steps of placing a first stop surface of a first stopping member connected to a first blade toward and into engagement with a second stop surface of a second stopping member connected to a second blade by squeezing first and second handle members connected to the first and second blades, holding the concave and convex surfaces together using the handle members, inserting the first blade and the second blade into the food item so that the core of the food item is encompassed by the first and second blades, removing the first and second blades from the food item so that the core is removed from the food item, relaxing a grip on the first and second handle members so that the first and second blades move away from one another and the core of the food item is released.

DETAILED DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

Food coring devices according to the present disclosure and their individual components may be variously configured without departing from the scope of the present disclosure.

Figure 1:
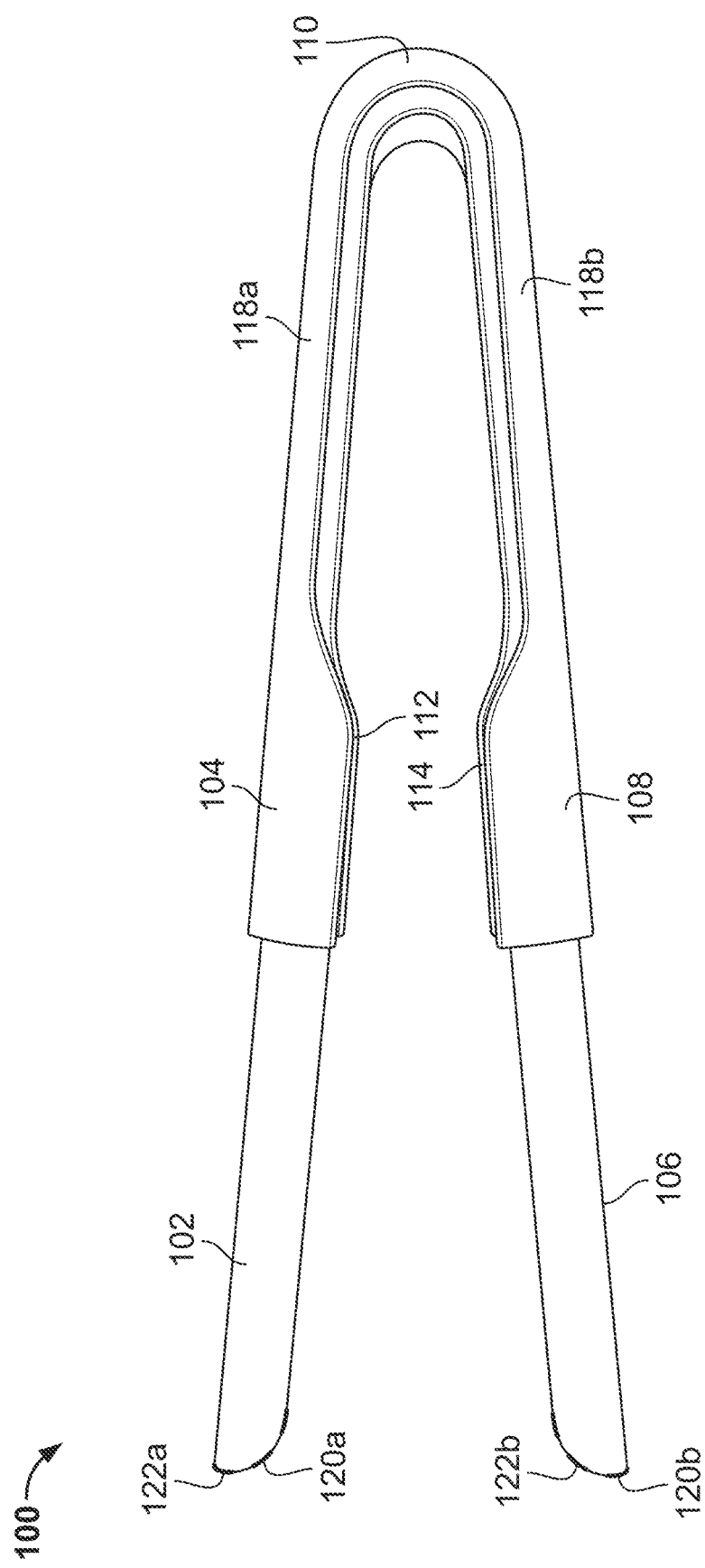
FIG. 1 is a side elevational view of a first embodiment of a food coring device, showing the first and second stop members of the device in a first position.

An embodiment of the food coring device of the disclosure is indicated in general at 100 in FIG. 1. The coring device 100 has a first blade 102 and a second blade 106. The first blade 102 is attached to a first stop member 104 and the second blade 106 is attached to a second stop member 108. The first blade 102 opposes the second blade 106. The first stop member 104 includes a convex stop surface (shown in FIG. 3 at 112) and the second stop member 108 includes a concave stop surface (shown in FIG. 3 at 114). As illustrated in FIGS. 1 and 3-5, when the first and second stop members of the device 100 are in the first position, the convex and concave stop surfaces of the first and second stop members are disengaged. A spring member or portion 110 urges the first and second stop members into the first position.

Figure 2:
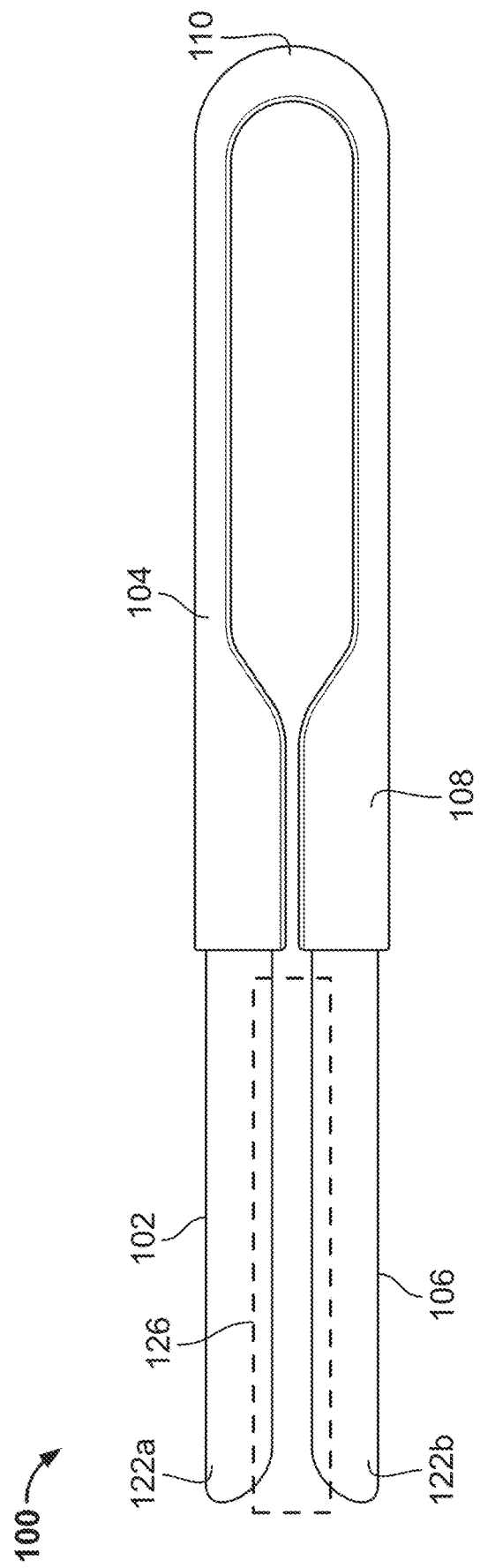
FIG. 2 is a side elevational view of the coring device of FIG. 1, showing the first and second stop members of the device in a second position.
Figure 3:
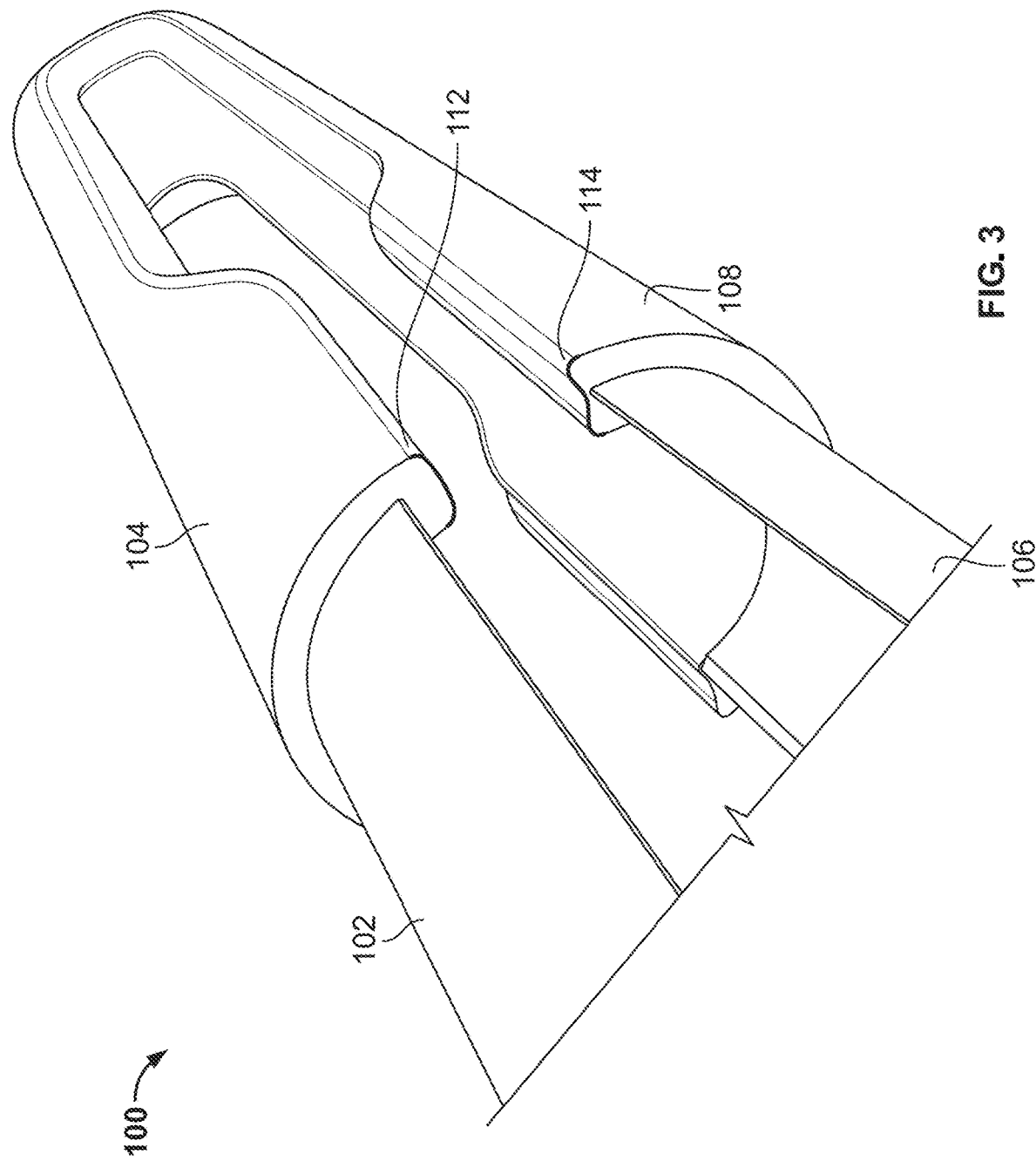
FIG. 3 is an enlarged front perspective view of the body of the coring device of FIG. 1, showing convex and concave surfaces of the stop members.
Figure 6:
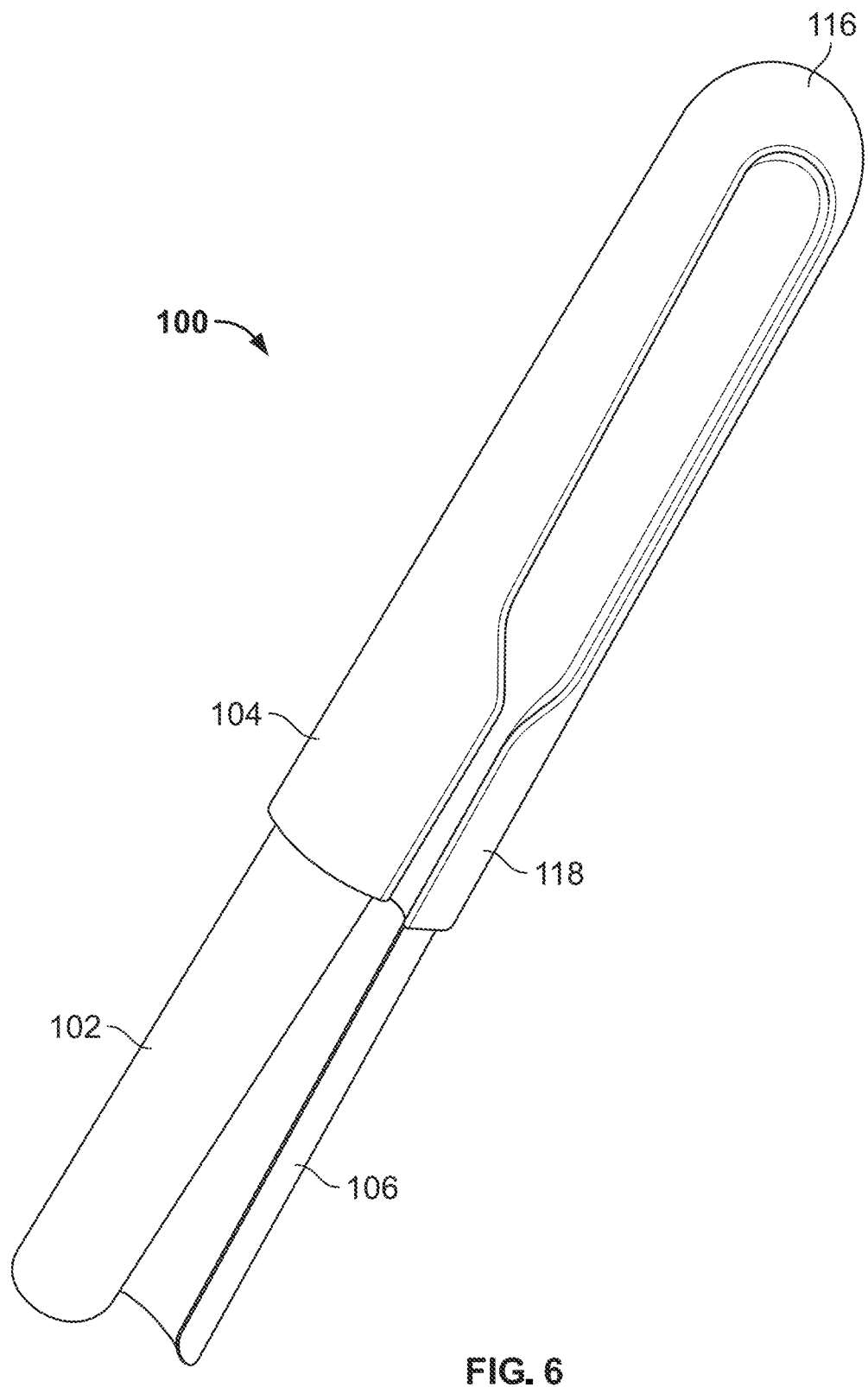
FIG. 6 is a side perspective view of the coring device of FIG. 1, showing the coring device as the stop members are being moved between the first and second positions.

The first and second stop members may be placed in a second position, illustrated in FIG. 2, by a user squeezing first and second handle members 118*a* and 118*b* (FIG. 1) so as to move the first and second stop members together, against the urging of spring member 110, such that the convex stop surface (112 in FIG. 3) is engaged by the concave stop surface (114 in FIG. 3). An illustration of the device as the stop members are transitioning between the first and second position is illustrated in FIG. 6.

With the stop members in the second position, the engaged convex and concave stop surfaces keep the first blade aligned with the second blade as the blades are pushed into the food item and encompass the core of the food item. The user may then remove the first and second blades from the food item such that the blades and convex and concave surfaces remain held together with the core (indicated in phantom at 126 in FIG. 2) therebetween. As a result, the core is removed from the food item. After the core is removed, the user may relax his or her grip on the first and second handle members such that the first and second blades move away from one another due to the urging of spring member 110 so that the core of the food item is released.

Figure 7:
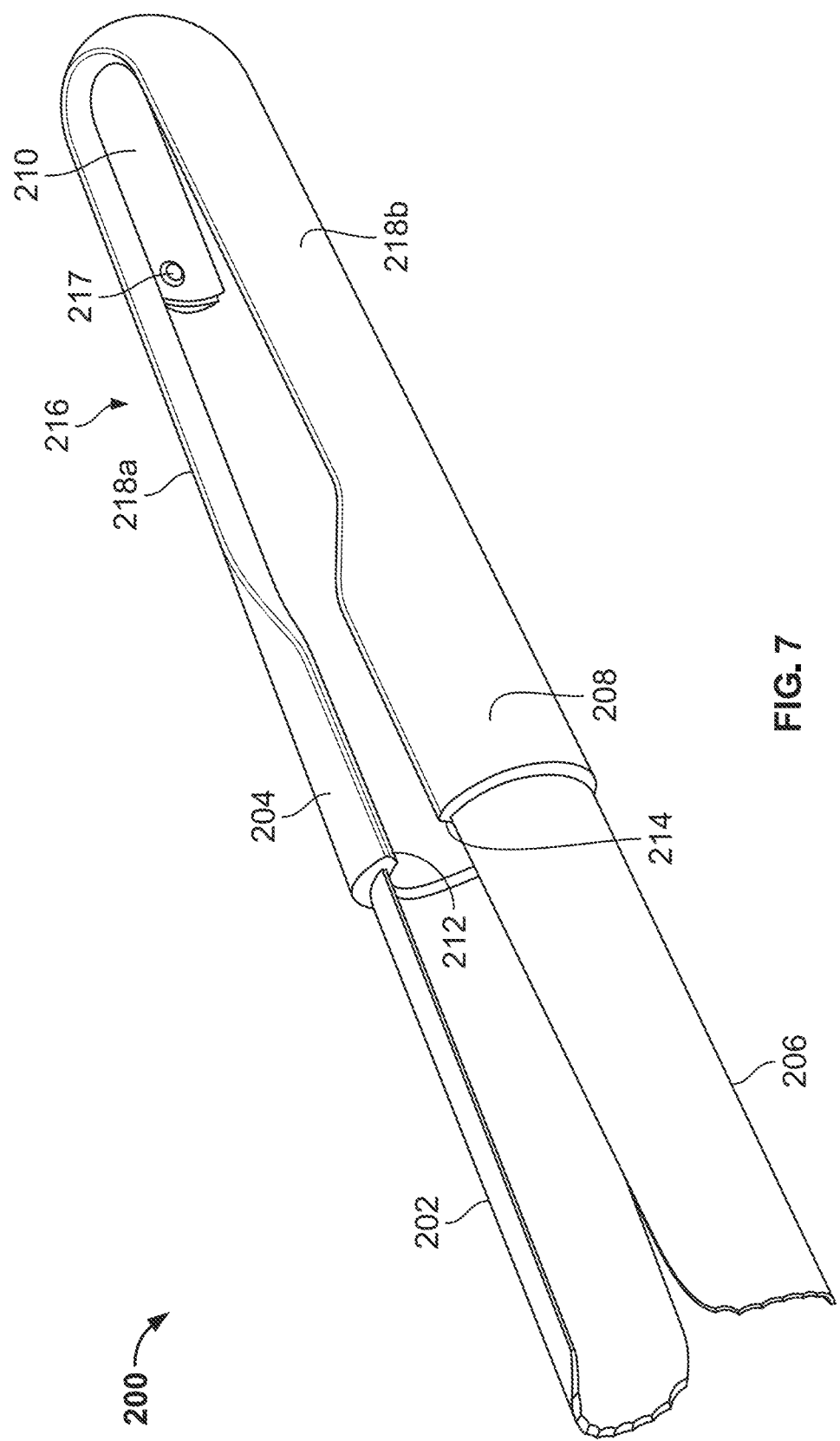
FIG. 7 is a perspective view of a second embodiment of a food coring device.
Figure 8:
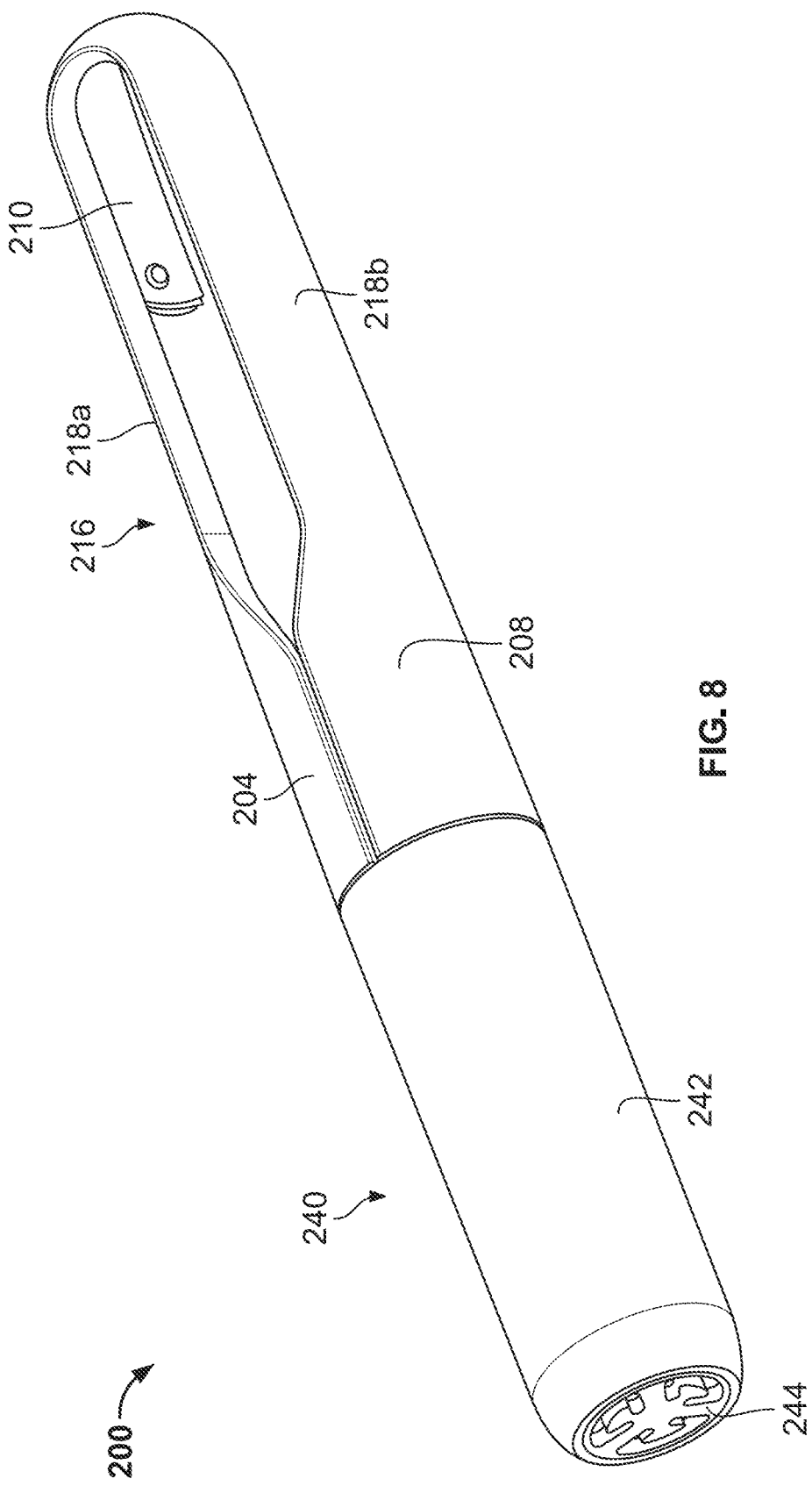
FIG. 8 is a perspective view of the device of FIG. 7 with a storage cap installed.

As an alternative to the convex and concave stop surfaces, the stop surfaces may take alternative forms including, but not limited to, flat (as illustrated in the embodiments of FIGS. 7 and 8 described below) or any slot, recess, dimple, trough or indentation of any shape that receives any protrusion, tab, rib, knob, pin or the like.

Figure 5:
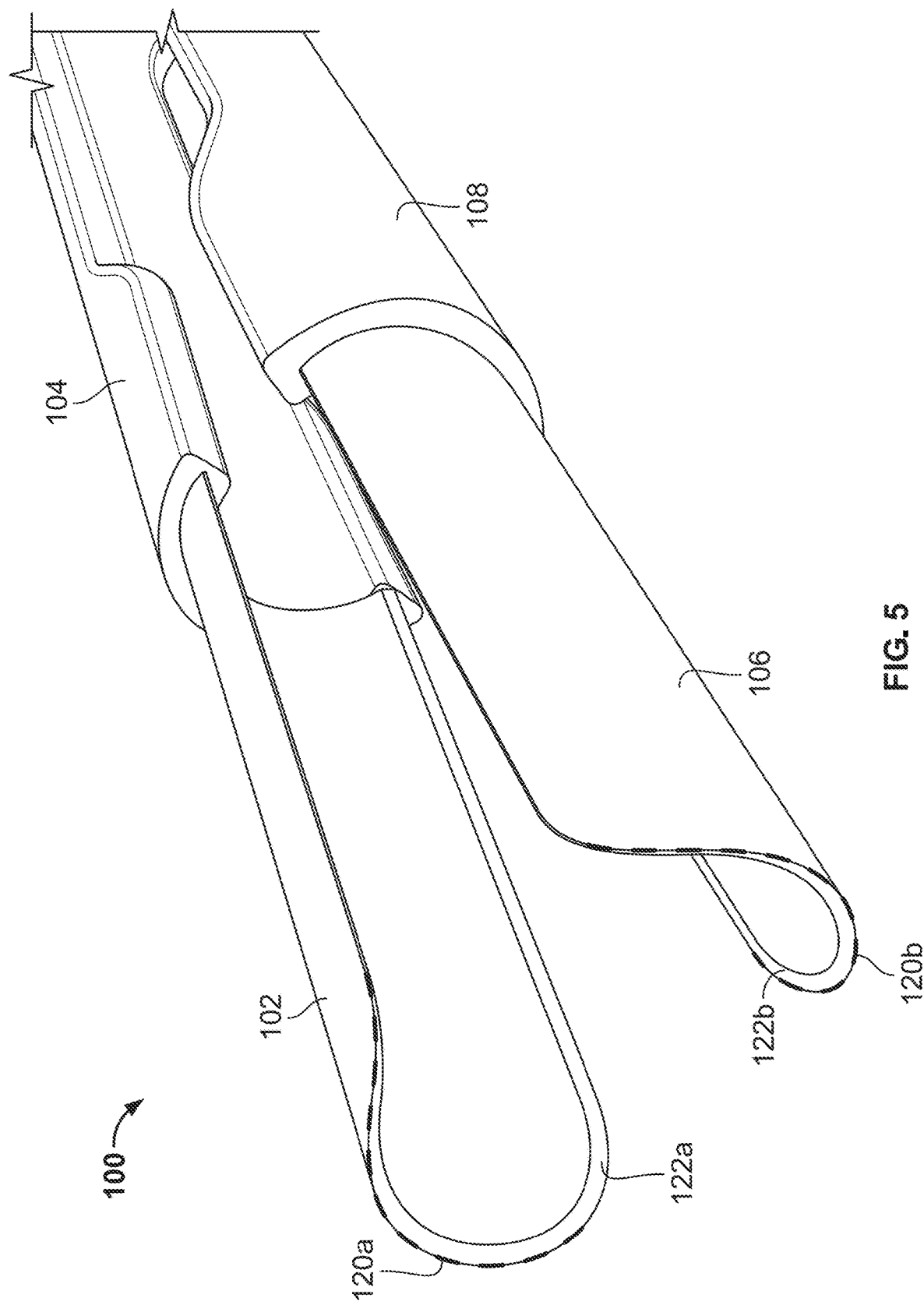
FIG. 5 is an enlarged front perspective view of the blades of the coring device of FIGS. 1-4, showing the serrated edges of the blades.

As shown in FIGS. 1 and 5, the blades 102, 106 preferably have curved cross-sections, curved tips 122*a* and 122*b* and serrated edges 120*a* and 120*b*. Some or all of these features may make it easier for the blades to penetrate the food without squishing the food item. For example, if coring a tomato, the serrated blades 120 could cut through the delicate skin and flesh of a tomato without causing excess compression of the food item. The blades may be made out of materials known to skilled persons in the art including, but not limited to, stainless steel.

Figure 4:
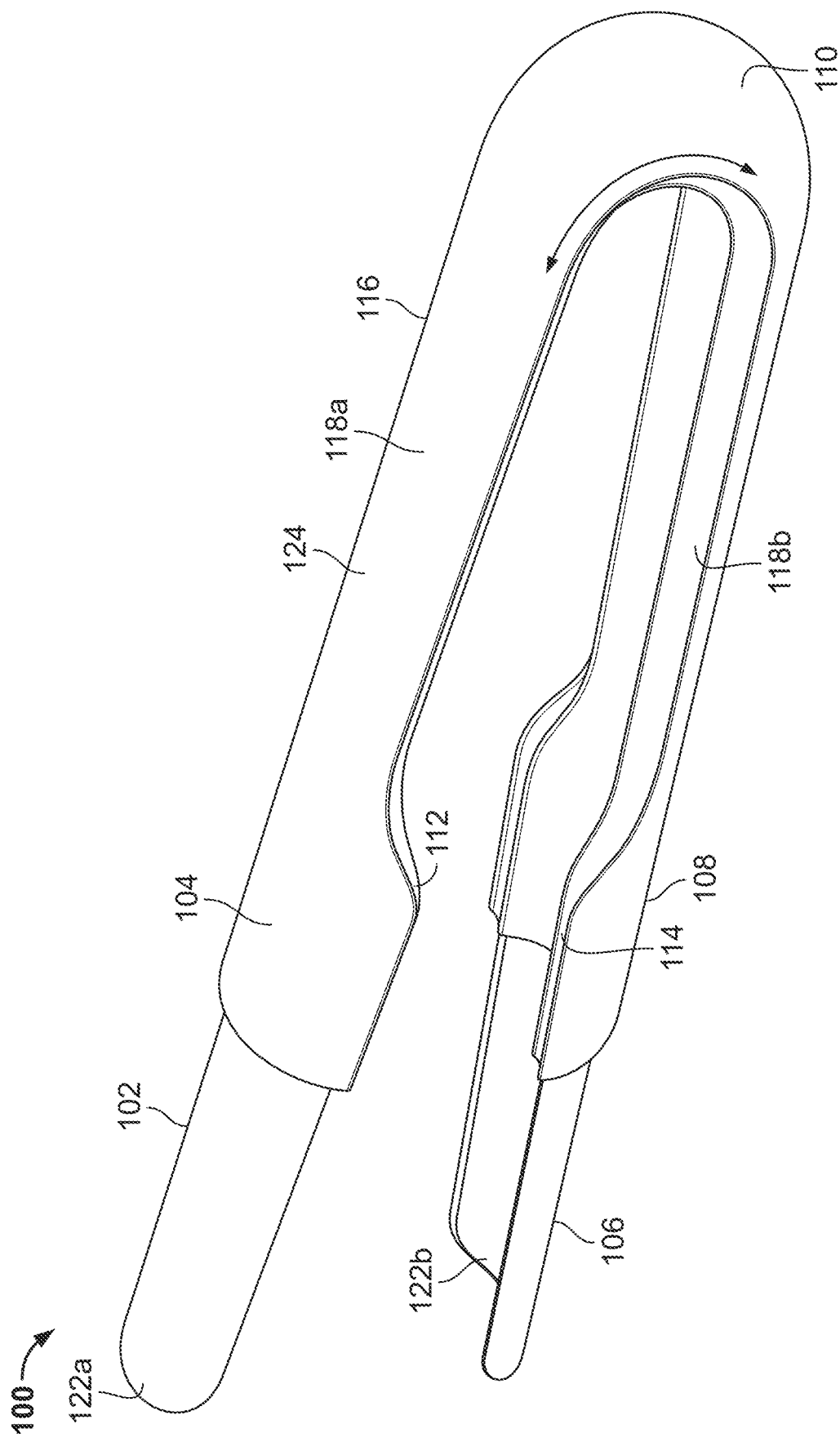
FIG. 4 is a rear perspective view of the coring device of FIG. 1.

In the illustrated embodiment, the first and second stop members 104 and 108, the spring member 110 and the handle members 118*a* and 118*b* are formed as a single body (116 in FIG. 4). As an example only, the body may be integrally molded of a plastic (such as polycarbonate) or other material. The connection between the blades 102 and 106 and the stopping members 104 and 108 may be made by molding the body to the blades, an interference fit, a mechanical bond, an adhesive bond or any other appropriate connection known to one of ordinary skill in the art.

The device may also be constructed by using a single piece of material for the blades (such as stainless steel or another metal) that is formed in a U-shape with an insert portion of the resulting structure inserted into a mold and the body 116 then molded over the insert portion so that only the opposing blades 102 and 106 are exposed.

In an alternative embodiment, the first and second stop members may be formed separately, and spaced, from the handle member and the spring member. In addition, in alternative embodiments, the spring member may be formed separately, and spaced from the handle member.

Furthermore, while the spring member 110 is illustrated as a U-shaped semi-rigid portion of material (such as plastic or plastic with a metal insert molded therein), in alternative embodiments, the spring member may be a compression coil spring extending between opposing portions of the handle members. blades or opposing body portions positioned adjacent to the handle members or blades.

As best shown in FIG. 4, the curved cross-section of the blades allows for the device to more easily encompass a circular and/or ovular core as the device is inserted into the food item. The handle members 118*a* and 118*b* may be textured (as indicated at 124 in FIG. 4) to make gripping and use easier.

A second embodiment of the food coring device of the disclosure is indicated in general at 200 in FIG. 7. The coring device 200 has a first blade 202 and an opposing second blade 206. The first blade 202 is attached to a first stop member 204 and the second blade 206 is attached to a second stop member 208. The first and second stop members are part of a body 216 that also includes first and second handle members 218*a* and 218*b*.

The first and second stop members 204 and 208 of the device 200 have stop surfaces 212 and 214, respectively, that contact one another when the first and second blades are moved towards one another into the position of FIG. 8.

With reference to FIG. 7, a U-shaped spring member 210 urges the first and second blades into the illustrated positions. In the embodiment of FIG. 7, the spring member 210 may be made of metal and is secured to the inner surface of the body 216, which may made of molded plastic, via pin 217. A second pin, not visible in FIG. 7, mirrors pin 217 to further secure the spring member 210 in place.

The first and second stop members 204 and 208 may be placed in a second position, illustrated in FIG. 8, by a user squeezing first and second handle members 218*a* and 218*b* towards one another against the urging of spring member 210.

With the stop members 204 and 208 in the configuration illustrated in FIG. 8, a storage cap, indicated in general at 240, may be placed over the first and second blades 202 and 206 of FIG. 7. As a result, the device 200 is held in the configuration of FIG. 8 for ease of storage and to protect the blades. As an example only, the storage cap 240 may feature a cylindrical sidewall 242 with and an end wall 244. The end of the storage cap 240 opposite end wall 242, not visible in FIG. 8, is open to receive the first and second blades 202 and 206 of FIG. 7.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A food coring device comprising:
   a first blade and a second blade,
   a first stop member and a second stop member, wherein the first blade is attached to the first stop member and the second blade is attached to the second stop member with the first blade opposing the second blade and the first stop member including a pair of first stop surfaces and the second stop member including a pair of second stop surfaces;
   a spring member urging the first and second stop members towards a first position where the first and second stop surfaces are disengaged wherein the first and second stop members are placed in a second position by moving the first and second stop members together against the urging of the spring member such that the first stop surface is engaged by the second stop surface with the first blade and the second blade being aligned but disengaged;
   a body including a curved cross-section extending between a pair of edge portions, said body including first and second handle members and the first and second stop members, wherein the pair of edge portions including the first and second pair of stop surfaces;
   said pair of first stop surfaces each including an elongated convex surface and said pair of second stop surfaces each including an elongated concave surface, each elongated concave surface configured to receive an opposing one of the elongated convex surfaces when the first and second stop members are in the second position.

2. The coring device of claim 1 wherein the blades have serrated edges.

3. The coring device of claim 2 wherein the blades are curved.

4. The coring device of claim 1 wherein the spring member secured to the body.

5. The coring device of claim 1 wherein the body is formed of molded plastic.

6. The coring device of claim 1 further comprising a storage cap configured to cover the first and second blades when the first and second stop members are in the second position.

7. The coring device of claim 1 wherein the first and second blades are constructed from stainless steel.

* * * * *